Figure 1:
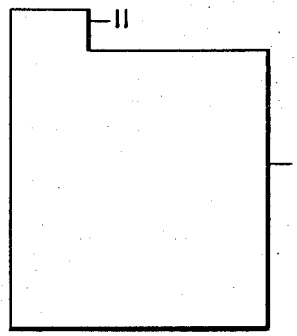

April 7, 1959          J. C. DUDDY          2,881,237

STORAGE BATTERY PLATE AND PRODUCTION THEREOF

Filed Aug. 28, 1951

INVENTOR
JOSEPH C. DUDDY

BY:
*Edward J. Dwyer*
ATTORNEY

United States Patent Office 2,881,237
Patented Apr. 7, 1959

2,881,237

STORAGE BATTERY PLATE AND PRODUCTION THEREOF

Joseph C. Duddy, Langhorne, Pa., assignor to The Electric Storage Battery Company, a corporation of New Jersey Application August 28, 1951, Serial No. 243,933

10 Claims. (Cl. 136—29)

The invention relates to storage battery plates, particularly to positive plates used in alkaline batteries, and to methods of producing such plates.

It has been found that, in connection with many varied modern applications of storage batteries, there is a great need for such a battery that is relatively light and has a high coefficient of use of the active material of the positive and negative plates, particularly when such battery is discharged at high rates. Other highly desirable features include low stand loss characteristics and ease of manufacture.

To fulfill many of these requirements the alkaline type of storage battery is peculiarly adapted, particularly that type of alkaline battery utilizing a silver salt such as, for example, silver oxide, silver peroxide, or silver chloride for the positive active material, and zinc or cadmium as the negative active materials in an alkaline electrolyte.

In the production of such a battery it is conventional practice to form the positive plate by filling a metal grid with a paste of silver or silver salt and, subsequently, to dry the plate and subject it to further treatment to form it into the desired active material. Several disadvantages are however, inherent in such practice. The presence of a grid member, although possibly desirable for some applications from the standpoint of strength, adds both size and weight to the battery with no commensurate gain in electrical output. Additionally, although grids formed of copper have been used by reason of the high conductivity of that metal, they have proven unsatisfactory in the secondary type of battery due to the copper leaching out of the positive and setting up local action or self-discharge whereby the life of the battery is materially shortened.

Other metals such as stainless steel, nickel, Monel, and magnesium, have been utilized as grids since they are resistant to alkaline electrolyte. These metals are, however, so poor in electrical conductivity as definitely to limit the watt hour energy obtainable at high rates of discharge. Other metals which are resistant to strong alkalis and have the requisite conductivity are either too expensive or are difficult to process.

Broadly, the invention relates to a method of producing porous silver of the type that can alone be used for storage battery plates without the necessity of a separate grid member to support the active material. It will be understood, however, that the invention permits the use of separate grids with the same type of plate where desirable from the standpoint of strength, such grids being produced of metals heretofore undesirable by reason of poor electrical conductivity. Additionally the invention relates to a new method of producing porous silver structures, such structures being an intermediate product that can then be further processed to produce the storage battery plates referred to above.

In the drawing, wherein like numerals are used to designate like parts:

Figure 1 is an elevational view of a sheet of porous metallic silver representing an intermediate stage in the production of a storage battery plate.

Figure 2:
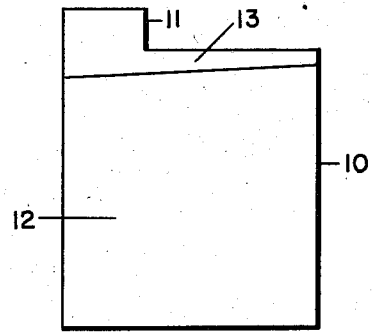
Figure 3:
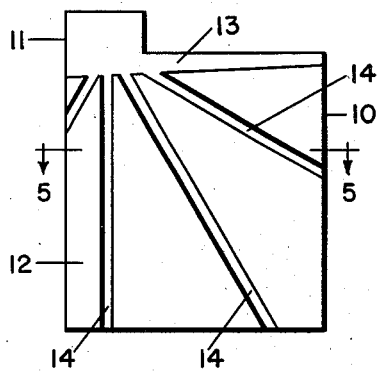
Figure 4:
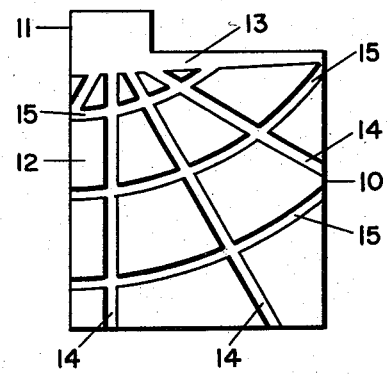

Figures 2, 3, and 4 are elevational views of storage battery plates having various conductive areas formed thereon in accordance with the invention.

Figure 5:

Figure 5 is a cross sectional view taken along the line 5—5 of Figure 3.

Referring now to the drawing, Figure 1 shows a sheet of porous metallic silver which represents the product of the first stage of the process which is to be hereinafter described.

To produce the sheet shown in Figure 1, there is utilized a sheet of porous combustible material of the approximate size and shape desired in the finished product. Although any carbon base material can be used depending on the thickness and porosity desired in the plate certain materials such as filter paper, porous synthetic resins, and cloth have been found to be desirable by reason of availability and cheapness of cost.

The shaped base material is impregnated with a metal compound from which the active material will eventually be formed, such as silver nitrate ($AgNO_3$), as by dipping into a saturated aqueous solution or a hot melt of the same, and the material partially dried by evaporation of a portion of the water. The base material is ignited and combustion proceeds leaving a fine sheet of porous silver.

Although the exact nature of the combustion of $AgNO_3$ has not been determined, it is felt that silver acetylide ($Ag_2C_2$) is formed as an intermediate compound by reason of combination with the carbon from the carbonaceous base material. The first step in the combustion i.e. $AgNO_3$ to $Ag_2C_2$, is an endothermic reaction. Since this takes place simultaneously with the combustion of the carbonaceous base material, an exothermic reaction, and since there is an imbalance in favor of the exothermic reaction, the combustion will proceed on a self sustaining basis. The further decomposition of the metallic compound from $Ag_2C_2$ to metallic silver is strongly exothermic.

As a result of the combination of exothermic reactions, the combustion of the carbon bearing material will proceed with great rapidity and at a temperature that will, at its peak, exceed the melting point of silver, namely 1760° F. and the fine porous silver networks will melt into globules of metal having no porosity. To avoid this, the preliminary drying of the base material is controlled so that evaporation of the water only occurs to the point where initial crystallization of the silver salt occurs, and then the material is ignited. Evaporation of the residual water, an endothermic reaction, acts to buffer or moderate the peak temperature to a point substantially below the melting point of the silver. Thus, although the silver salt is efficiently converted to metallic silver, the porous network remains physically unaffected. The range of temperatures within which this step can be carried out is from about 600° F. to 1250° F. but the peak temperature is preferably kept below about 850° F. above which temperature progressively increasing sintering of the silver particles would occur.

As an alternative to the procedure above described it has been discovered to be advantageous to incorporate into the impregnating solution from about 10% to about 20% by volume of glycerine. If this be done, the impregnated material can then be oven dried at about 212° F. to 230° F. to remove completely the water, leaving behind a predetermined amount of glycerine which then serves as a buffer to reduce the peak temperature of combustion to the desired values. Furthermore, it has been determined that if the material be completely oven dried at a temperature of about 250° F. to 350° F., ignition and combustion will proceed spontaneously after complete removal of the water. It will be understood that, if the silver nitrate has been applied to the base material in the form of a hot melt, the water or other buffer can be added separately.

Test data and observations representative of the above described process and the type of porous metallic silver plate produced thereby, are set forth below. As a base material, various commercial grades of filter papers were used and can be described as follows:

Whatman #1—an unwashed filter paper of medium weight, speed, and density.

Whatman #2—an unwashed filter paper having a lighter ash content and density than #1.

Whatman #31—a filter paper washed in hydrochloric acid; soft and with open texture. Rapid filtration and minimum ash content.

Whatman #40—Filter paper doubly washed in hydrochloric and hydrofluoric acids; hard finish; minimum ash content.

Munktell #2—unwashed filter paper of soft finish; of close texture and medium speed.

sistant to electrolytic corrosion during alternate charges and discharges of the battery thereby mechanically strengthening the plate and (2) to take advantage of the high conductivity of the compacted silver whereby the electrical energy can readily be gathered from throughout the plate and carried to lug 11 with a minimum of internal resistance. It will be understood that in carrying out these two purposes, any desired portion of the plate can be so compacted and that Figures 2, 3, 4 and 5 are merely illustrative of the way in which the objects of the invention can be achieved. In the final analysis, the optimum amount of silver to be so compacted is determined by an analysis of the increased strength and decreased internal resistance derived therefrom as compared with the decrease in electrical efficiency of the battery resulting from the fact that the compacted material in the plate will not enter into the

TEST RESULTS AND OBSERVATIONS
Table A

| | Paper | Glycerine, percent | Ignition | Combustion | Plate quality |
|---|---|---|---|---|---|
| 1 | Whatman #1 | 10 | Flame | Slow, incomplete | Good. |
| 2 | do | 10 | Furnace | Rapid, complete | Fair. |
| 3 | do | 20 | Flame | Medium slow, complete | Do. |
| 4 | do | 20 | Furnace | Violent, complete | Poor. |
| 5 | Whatman #2 | 10 | Flame | Rapid, complete | Do. |
| 6 | do | 10 | Furnace | Slow, complete | Good. |
| 7 | do | 20 | Flame | Medium slow, complete | Fair to very good. |
| 8 | do | 20 | Furnace | Violent, complete | Poor. |
| 9 [1] | do | 20 | Flame | Slow, incomplete | Very good.[2] |
| 10 | do | 20 | Infra-red | Violent, complete | Poor. |
| 11 | Whatman #31 | 10 | Flame | Slow, incomplete | Good.[2] |
| 12 | Whatman #40 | 10 | do | do | Very good.[2] |
| 13 | do | 10 | Furnace | Slow, complete | Good. |
| 14 | do / Munktell #2 | 20 / 10 | Flame / do | Medium slow, incomplete / Very slow, incomplete | Fair. / Good. |

[1] General procedure was to dip the paper twice into the silver nitrate-glycerine solution. This paper was given three dips.
[2] Combustion was completed in a furnace.

At this stage, the porous metallic silver plate 10 and lug 11 are composed of small particles of the metal weakly cohered together in a spongy mass having little mechanical strength. Plate 10, is therefore, placed in a press to consolidate the particles under pressure whereby increased mechanical strength will be gained by an actual interlocking of the particles. The press, of any conventional type, is preferably so constructed that differential pressures can be applied to various areas of the porous metal for reasons to be set forth hereinafter.

In its porous state, the silver has low bulk density in the nature of about 3.5–4.0 grams per cubic centimeter. It has been found desirable to press the greater part of the metal, designated as 12 in Figure 2, at a pressure of about one ton per square inch to compact the silver to a bulk density of about 4.5 to 5.0 grams per cubic centimeter. The press is also preferably constructed so as to apply simultaneously a pressure of about forty tons per square inch to lug 11 and top bar area 13, thus consolidating such portions of the metal to a bulk density of about 8.5 to 9.0 grams per cubic centimeter. It will be noted in this connection that metallic silver normally has a bulk density of about 10.5 grams per cubic centimeter.

Additionally, if desired, the press may be so constructed as to apply the higher pressures to various areas of the porous silver as shown in Figures 3, 4, and 5 wherein the numeral 14 indicates a plurality of strips extending radially from lug 11 across the surface of plate 10, and the numeral 15 (Figure 4) indicates a plurality of arcuate strips extending across the face of plate 10 concentrically to lug 11.

The purpose of pressing the plate to compact thoroughly the porous silver of lug 11, top bar area 13, and strips such as 14 and 15 is two-fold (1) to form dense, substantially non-porous metallic silver that will be reelectro-chemical reactions. Furthermore, the specific areas to be compacted depend upon the actual flow of electrical energy in the various portions of the plate.

Having produced a plate consisting of porous metallic silver and substantially non-porous metallic silver, and of the size and shape desired for the battery, such plate may be charged in any conventional manner by passing a current therethrough while it is in a bath of alkaline electrolyte such as sodium hydroxide or potassium hydroxide, the result being that the porous silver is reduced to porous silver peroxide ($Ag_2O_2$) and silver oxide ($Ag_2O$) and the relatively non-porous silver is unaffected, the silver peroxide and silver oxide serving as active material. It will be understood that if silver chloride is desired as the active material, the charging will be carried out in a bath of suitable chloride ion content.

Sample plates having for their active material the porous finely divided silver made in accordance with the process described were charged to produce active electrode material, such as silver oxide and silver peroxide, and then discharged in comparison with a conventional pasted silver positive plate and the results tabulated as follows, plate A being the conventional plate and plates B and C being produced in accordance with the present invention.

Table B

| Plates | Weight Ag, gms. | Plate thickness, inches | Temp. electrolyte, °F. | Volts at .05 min. | Volts at 1 min. | Min. to 1 volt |
|---|---|---|---|---|---|---|
| A | 28 | .020–.023 | 83 | 1.48 | 1.30 | 7.40 |
| B | 20.5 | .018–.020 | 83 | 1.54 | 1.40 | 7.00 |
| C | 20.7 | .017–.019 | 85 | 1.62 | 1.47 | 6.00 |

The above set forth process is particularly useful in producing a positive plate for batteries adapted to undergo discharges at high rates and to have a high output of electrical energy for relatively small size and weight. Should long life, or strength be the criteria, however, a grid of metal resistant to the alkaline electrolyte can be used if desired. In such case, after the base material is burned, a grid of such metal as magnesium, Monel, stainless steel, or nickel is inserted between two sheets of the porous metallic silver plate. The combination can then be inserted into a press and pressure applied whereby the body of the silver will be forced into the grid and the desired portions simultaneously further compacted, and the plate further treated to produce the desired active material. The use of grids formed from these relatively non-conductive metals, and so embedded in the battery electrodes is made practical only by the enhanced conductivity of the compressed portions of the plate produced in accordance with my invention.

It will thus be seen that there has been developed a novel process for the production of porous silver for use in storage battery plates, and an improved storage battery plate so formed as to be usable without the support of a grid member.

The examples here given and the particular description set forth are merely presented in order to illustrate how the invention may be applied. Other forms and variations coming within the scope of the appended claims will readily suggest themselves to those skilled in the art.

I claim:

1. The method of producing battery plates which comprises initiating combustion of a combustible material having dispersed therethrough a reducible compound of silver which as a result of combustion of said material is reduced to finely divided silver, said material being selected from the group consisting of filter paper, combustible synthetic resins and cloth, continuing said combustion at a temperature substantially below the melting point of silver to produce from said compound of silver a spongy mass of coherent finely divided silver of high uniform porosity, said compound of silver being one which is decomposed and reduced to form said spongy mass at said temperature substantially below the melting point of silver, and converting said finely divided silver into active electrode material.

2. An electrode for batteries according to the method of claim 1.

3. The method of claim 1 in which said reducible compound of silver is silver nitrate.

4. The method of claim 1 in which said combustible material is porous and has said reducible compound dispersed therethrough by impregnating said material with a saturated aqueous solution of silver nitrate containing about 10% to 20% glycerine and in which said temperature substantially below the melting point of silver is within the range of from 600° F. to 1250° F.

5. The method of claim 1 in which, before converting said finely divided silver to active electrode material, a light pressure is applied to said mass to increase the strength thereof while maintaining said porosity of said mass.

6. The method of claim 1 in which, before converting said finely divided silver into active electrode material, said mass is forced into a grid to provide increased mechanical strength.

7. An electrode for batteries according to the method of claim 6.

8. The method of claim 1 in which, before converting said finely divided silver into active electrode material, there is applied to the major surface areas of opposite of said porous mass a light pressure to increase the strength of the mass and to selected portions of said mass there is applied a high silver-compacting pressure, and in which said active electrode material is formed from that portion of said finely divided silver subjected to said light pressure, said active electrode material being selected from the group consisting of an oxide of silver and silver chloride.

9. The method of claim 8 in which said light pressure is utilized to force said mass into a grid to provide increased mechanical strength.

10. An electrode for batteries according to the method of claim 9.

References Cited in the file of this patent

UNITED STATES PATENTS

| | | |
|---|---|---|
| 26,978 | Edwards | June 31, 1860 |
| 274,373 | Pitkin | Mar. 20, 1883 |
| 585,853 | Samuels | July 6, 1897 |
| 692,298 | Jungner | Feb. 4, 1902 |
| 975,980 | Morrison | Nov. 15, 1910 |
| 1,044,831 | Wackwitz | Nov. 11, 1912 |
| 1,955,115 | Drumm | Apr. 17, 1934 |
| 2,255,120 | Kiefer | Sept. 9, 1941 |
| 2,544,112 | Schneider | Mar. 6, 1951 |
| 2,561,943 | Moulton | July 24, 1951 |
| 2,681,375 | Vogt | June 15, 1954 |
| 2,818,462 | Solomon | Dec. 31, 1957 |

FOREIGN PATENTS

| | | |
|---|---|---|
| 780 | Great Britain | Mar. 14, 1896 |
| 20,478 | Great Britain | July 12, 1906 |